United States Patent
Bampton et al.

(10) Patent No.: US 7,922,841 B2
(45) Date of Patent: Apr. 12, 2011

(54) METHOD FOR PREPARING HIGH-TEMPERATURE NANOPHASE ALUMINUM-ALLOY SHEETS AND ALUMINUM-ALLOY SHEETS PREPARED THEREBY

(75) Inventors: Clifford C. Bampton, Thousand Oaks, CA (US); Patrick B. Berbon, Santa Barbara, CA (US); Steven G. Keener, Trabuco Canyon, CA (US)

(73) Assignee: The Boeing Company, Chicago, IL (US)

(*) Notice: Subject to any disclaimer, the term of this patent is extended or adjusted under 35 U.S.C. 154(b) by 534 days.

(21) Appl. No.: 11/071,403

(22) Filed: Mar. 3, 2005

(65) Prior Publication Data

US 2006/0198754 A1 Sep. 7, 2006

(51) Int. Cl.
*C22F 1/04* (2006.01)
*B22F 3/00* (2006.01)
(52) U.S. Cl. ............ 148/692; 148/696; 419/28; 419/29
(58) Field of Classification Search .................. 148/692, 148/696; 419/28, 29
See application file for complete search history.

(56) References Cited

U.S. PATENT DOCUMENTS

| | | |
|---|---|---|
| 3,172,546 A | 3/1965 | Schreiner |
| 3,740,210 A | 6/1973 | Bomford et al. |
| 3,771,480 A | 11/1973 | Johnson |
| 3,771,729 A | 11/1973 | Frable |
| 3,791,800 A | 2/1974 | McGee |
| 3,960,607 A | 6/1976 | Manzonelli et al. |
| 4,069,042 A | 1/1978 | Buchovecky et al. |
| 4,090,874 A | 5/1978 | Kaufman |
| 4,113,472 A | 9/1978 | Fister, Jr. et al. |
| 4,129,443 A | 12/1978 | Kaufman |
| 4,239,159 A | 12/1980 | Johns |
| 4,620,886 A | 11/1986 | Wincierz et al. |
| 4,647,304 A | 3/1987 | Petkovic-Luton et al. |
| 4,722,751 A | 2/1988 | Akechi et al. |
| 4,772,342 A | 9/1988 | Polmear |
| 4,818,481 A | 4/1989 | Luton et al. |
| 4,853,179 A | 8/1989 | Shiina |
| 4,909,867 A | 3/1990 | Masumoto et al. |
| 4,992,242 A | 2/1991 | Faure |
| 4,996,014 A | 2/1991 | Suvanto |

(Continued)

FOREIGN PATENT DOCUMENTS

WO WO 00/27559 A 5/2000

OTHER PUBLICATIONS

'Aluminum and Aluminum Alloys' ASM International, 1993, pp. 231-246, 319-320.*

(Continued)

*Primary Examiner* — Roy King
*Assistant Examiner* — Janelle Morillo
(74) *Attorney, Agent, or Firm* — Alston & Bird LLP

(57) ABSTRACT

An aluminum or aluminum-alloy material sheet comprised of an aluminum material having an ultra-fine, submicron grain structure. The strength and physical properties of the aluminum or aluminum-alloy material sheet are improved over previous aluminum and aluminum-alloy material sheets because the aluminum is produced by cryomilling the aluminum or aluminum-alloy materials into a metal powder with ultra-fine, submicron grain structure. The powder is consolidated and rolled into the form of a sheet.

15 Claims, 2 Drawing Sheets

U.S. PATENT DOCUMENTS

| | | | |
|---|---|---|---|
| 5,053,084 | A | 10/1991 | Masumoto et al. |
| 5,565,169 | A | 10/1996 | Webster |
| 5,728,479 | A | 3/1998 | Childree et al. |
| 5,775,603 | A | 7/1998 | Kohler et al. |
| 5,902,943 | A | 5/1999 | Schaffer et al. |
| 6,027,582 | A | 2/2000 | Shahani et al. |
| 6,171,038 | B1 | 1/2001 | Pratt et al. |
| 6,248,188 | B1 | 6/2001 | Smolej et al. |
| 6,267,684 | B1 | 7/2001 | Luhm |
| 6,315,842 | B1 | 11/2001 | Shahani et al. |
| 6,402,860 | B2 | 6/2002 | Hashikura et al. |
| 6,468,468 | B1 | 10/2002 | Neubing et al. |
| 6,531,006 | B2 * | 3/2003 | Jin et al. .......... 148/551 |
| 2004/0065173 | A1 * | 4/2004 | Fritzemeier et al. ......... 75/352 |

OTHER PUBLICATIONS

Liao, X.Z. et al., Deformation mechanisms at different grain sizes in a cryogenically ball-milled A1 -Mg alloy, Ultrafine Grained Materials II (2002), 323-330, Photomicrographs, Diffraction Patterns, 16 Ref. Minerals, Metals and Materials Society/Aime, Warrendale, PA; Conference: Ultrafine Grained Materials II.

Aiken, B..J.M. et al, Improvements in cryomill processing. Advanced Particulate Materials & Processes 1997, 287-294, Graphs, 6 Ref. Metal Powder Industries Federation, Princeton, NJ; Conference: 5th International Conference on Advanced Particulate Materials & Processes(APMP).

Lee, Z. et al., Microstructural evolution of cryomilled nanocrystalline Al-Ti-Cu alloy, Ultrafine Grained Materials II (2002), 653-659, Diffraction Patters, Photomicrographs, Graphs, 10 Ref. Minerals, Metals and Materials Society/Aime, Warrendale, PA; Conference: Ultrafine Grained Materials II.

Choi, J.H. et al., Consolidation behavior of nanocrystalline A1 -5at. %Ti alloys synthesized by cryogenic milling, Journal of Alloys and Compounds (Feb. 9, 2001) 315, (1-2), 178-186, Diffraction Patterns, Photomicrographs, Graphs, 22 Ref. ISSN: 0925-8388.

Han, B.Q. et al., High-temperature mechanical behavior of a nanostructured Al-7.5%Mg-0.3%Sc alloy, First and Second International Symposia on Superplasticity and Superplastic forming Technology: Proceedings From material Solutions 2001 and 2002 (2003), 33-38, Graphs, Photomicrographs, 19 Ref. ASM Itnernational. Member/customer Service Center, MAT.

Zhou F. et al, Thermally Stable Nanocrystalline AL-MG Alloy Powders Produced by Cryomilling, Materials Science Forum vols. 386-388 (2002) pp. 409-414, 2002 Trans Tech Publications, Switzerland.

* cited by examiner

METHOD FOR PREPARING HIGH-TEMPERATURE NANOPHASE ALUMINUM-ALLOY SHEETS AND ALUMINUM-ALLOY SHEETS PREPARED THEREBY

FIELD OF THE INVENTION

The present invention relates to high strength aluminum-alloy material sheets, and to the production of high strength aluminum-alloy material sheets made with cryomilled aluminum-alloy materials.

BACKGROUND OF THE INVENTION

Currently, in the fabrication of conventional high strength aluminum-alloy material components from sheet, thermal or heat-treating processes are included in the manufacturing process. These steps are to provide high strength by precipitation hardening. This creates three major problems for formed (shaped) sheet products: the heat treatments require a water quench which distorts the sheet and introduces undesirable residual stresses; sheet formability is often very poor in the fully heat treated (precipitation hardened) condition necessitating the sheet forming be carried out immediately after water quenching, before age hardening occurs, which happens even at room temperature; and operational exposures to elevated temperatures (above about 150° F.) cause permanent softening by over-aging (coarsening) of the precipitation precipitation hardening particles. The objectives of this invention are to provide high strength aluminum alloy material sheet that is easy to form in its full strength condition, without the need for a water quench and which does not permanently soften on exposure to elevated temperatures (below the alloy melting point).

SUMMARY OF THE INVENTION

Some embodiments of the invention comprise a cold-rolled aluminum or aluminum-alloy material sheet comprised of an aluminum material having an ultra-fine, submicron grain structure, i.e. an average grain size of less than 500 nanometers. The strength and physical properties of the aluminum-alloy material sheet are improved over previous aluminum-alloy material sheets because the aluminum is cryomilled as a powder to produce an ultra-fine, submicron grain structure prior to formation of the sheet.

The resulting cryomilled aluminum-alloy material sheet has improved material properties, the majority of which are directly dependent upon the ultra-fine submicron grain microstructure, in comparison to currently fabricated components in which additional thermal or heat treatment steps are necessary to impart the desired mechanical properties. The improved material properties may also be related to AlN particles incorporated with the microstructure.

By utilizing the cryogenic milling process, i.e., mechanical alloying of metal powders in a liquid nitrogen slurry, with aluminum and aluminum-alloy powders, ultra-fine grain microstructure nanocrystalline-alloy materials are produced. The cryomilling process produces a clean, high-strength, extremely ultra-fine, thermally stable grain size material powder. After the cryomilled metal-alloy powder has been degassed and consolidated through a Hot Isostatic Pressing (i.e., HIP) or 'Ceracon-type' forging process, the resulting nanocrystalline ultra-fine grain microstructure is extremely homogeneous. Once the highly homogeneous, cryomilled powder material has been consolidated, it may be extruded or drawn into various shapes that can be used as starting material for a sheet material. The aluminum-alloy material is cold- or hot-worked from the starting consolidated cryomilled material into the form of a sheet. This work is advantageously performed by a rolling mill using rolling mill techniques known in the art.

With the cryomilled aluminum-alloy material sheet, thermal treatment, including water quenching, steps are not required. In contrast, previous manufacturing practices call for considerable efforts involving several additional processing steps to be taken in the heat-treatment processing of aluminum-alloy materials in order to ensure that the resulting material has the desired strength level. The heat-treatment steps are costly and time consuming and the water quenching of traditional aluminum alloy materials is problematic due to uneven quench rates that result in residual stresses and distortion. The residual stresses and distortion are avoided in the present sheet material. Conventional aluminum alloy materials that are not used in an age-hardened (water quenched) condition, such as aluminum alloy 5083 material, typically have tensile strengths of about 45 ksi or lower. This can be doubled to about 90 ksi for the same alloy material (5083) via the cryo-milling process to submicron grain size. In addition, the ultra-fine grain size materials have low work hardening rates, allowing for larger strain reduction, and therefore larger rolling reduction before failure, compared with alloy materials having microstructures of conventional grain size.

The processed, nanocrystalline ultra-fine grain sheets may be subjected to the normal manufacturing steps associated with sheet forming and manipulation in order to form shaped metal objects from the sheet material. Formed objects may be attached to other structures, such as by welding, friction stir welding, or the use of fasteners. Formed metal objects produced in accordance with the invention are advantageously used in the construction of aerospace vehicles.

BRIEF DESCRIPTION OF THE DRAWINGS

Figure 1:
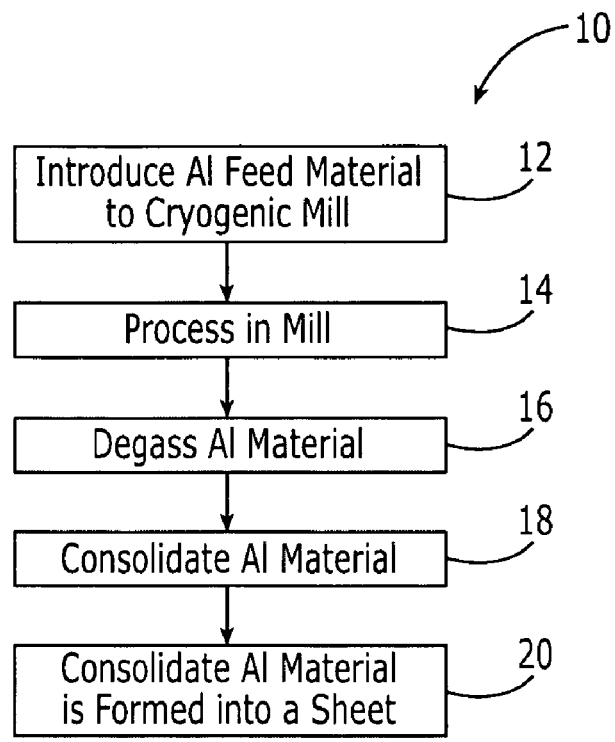
Figure 2:
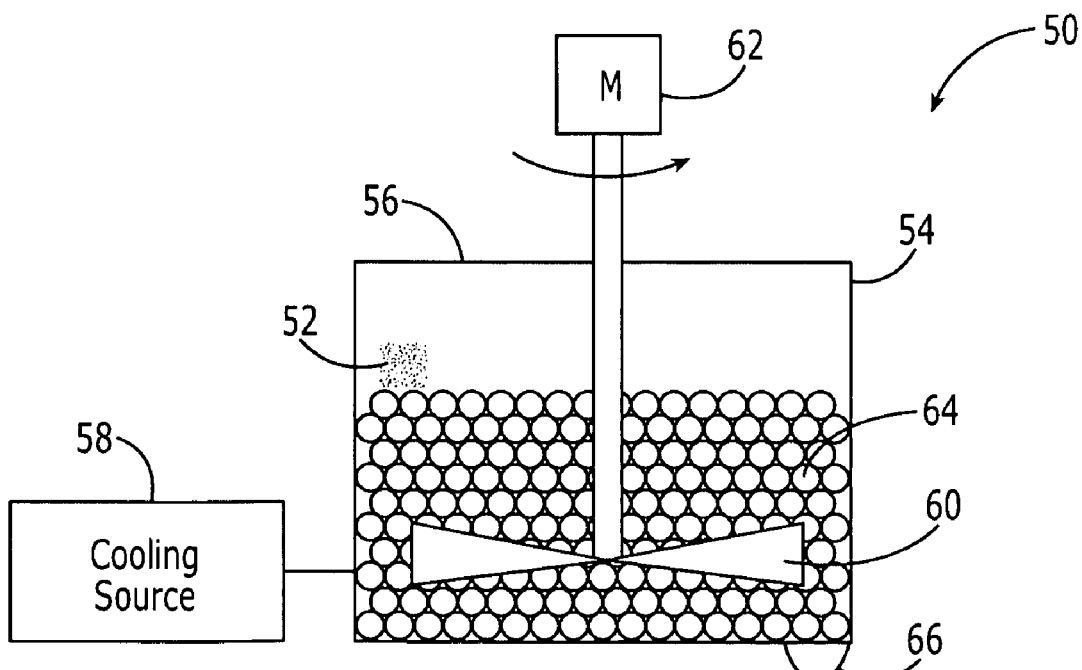
Figure 3A:
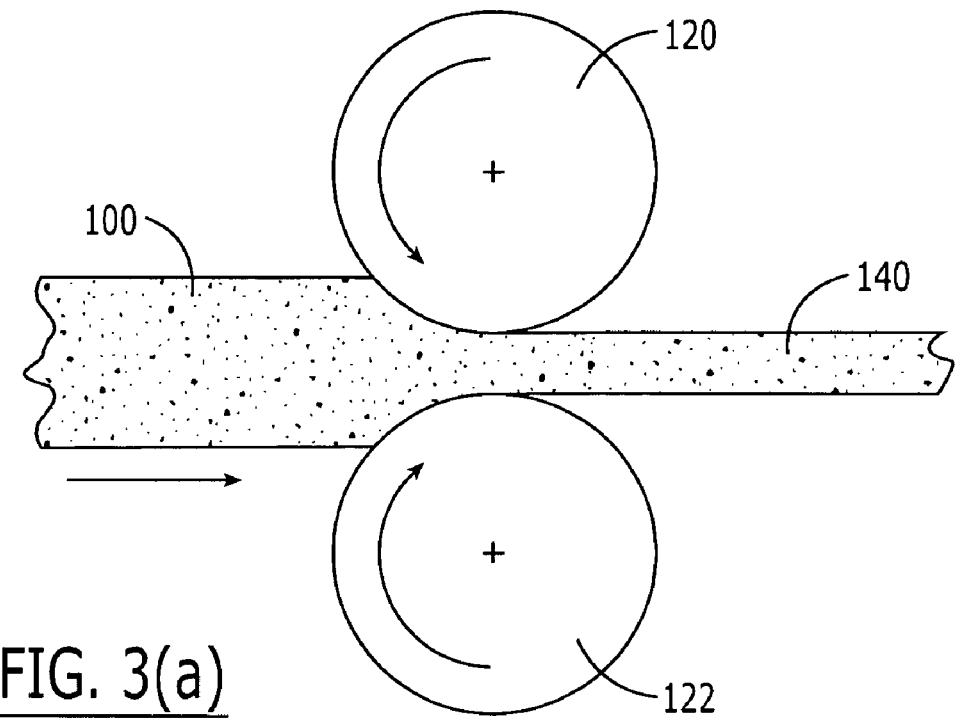
Figure 3B:
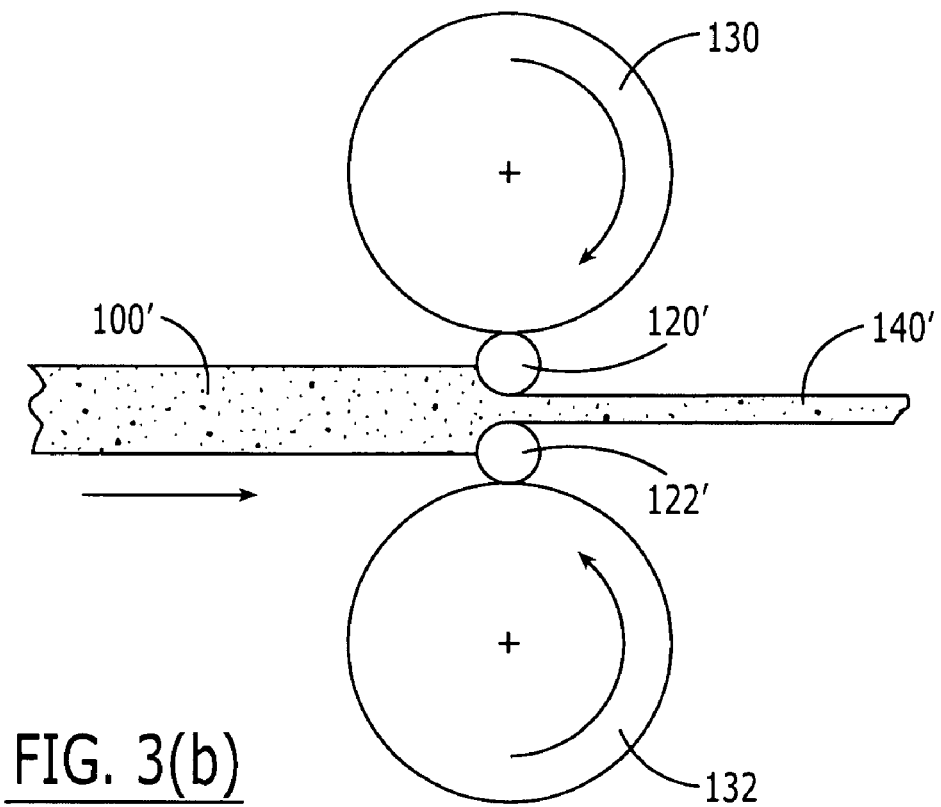

Having thus described the invention in general terms, reference will now be made to the accompanying drawings, which are not necessarily drawn to scale, and wherein:

FIG. 1 is logic flow diagram for producing an ultra-fine, submicron grain aluminum-alloy material product from an aluminum or aluminum-alloy raw material powder according to one embodiment of the present invention;

FIG. 2 is a sectional view of a high-energy cryogenic, attritor-type ball milling device used in the mechanical alloying of the aluminum or aluminum-alloy powders in accordance with another embodiment of the invention;

FIG. 3a is a sectional view of a two-high rolling mill for use in cold-rolling aluminum-alloy material into a sheet in accordance with another embodiment of the invention; and, FIG. 3b is a sectional view of a four-high rolling mill for use in cold-rolling aluminum-alloy material into a sheet in accordance with another embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a logic flow diagram for producing an aluminum-alloy material sheet having an ultra-fine, submicron grain metallurgical structure is shown generally as 10. The process starts in step 12 by introducing an aluminum-alloy raw material powder into a high-energy cryogenic, attritor-type ball milling device. The aluminum-alloy powders listed above may be comprised of any aluminum or aluminum-alloy material having a majority wt % aluminum as is well known in the art.

For convenience, the term "aluminum-alloy" as used herein is generally inclusive of commercially pure aluminum and aluminum alloy materials as further described below. In particular, preferred alloying elements of magnesium, titanium, molybdenum, vanadium, tungsten, iron, nickel, cobalt, manganese, copper, niobium, zinc, lithium, silicon, titanium, and chromium can be used in accordance with the processes of this invention to produce alloy materials that may have greater low, ambient, and elevated temperature strengths than corresponding dispersion strengthened aluminum-alloy materials and other aluminum-alloy materials formed by methods other than by the invented method.

Binary, tertiary, or multi-component aluminum-alloy materials may be used with the invention, including but not limited to 5083, 2017-T3, 2117-T3, and 7050-T73 alloys. If the beginning metallic raw material powder is supplied as pre-alloyed powder, then it can proceed directly to the cryomilling process. Metal powders that have not been previously alloyed can also proceed to the cryomilling step, since the cryomilling will intimately mix the constituents and thereby alloy the metals.

An exemplary aluminum-alloy material and exemplary method of processing the aluminum-alloy material is disclosed in co-pending U.S. patent application Ser. No. 10/263,135, the disclosure of which is incorporated herein by reference to the extent it does not conflict with the instant disclosure. The exemplary alloy material is composed of at least 50% aluminum by weight in combination with alloying elements selected from the group consisting of copper, magnesium, zinc, zirconium, lithium, silicon, titanium, and combinations thereof. An advantageous embodiment of the exemplary alloy material comprises 89 atomic % to 99 atomic % aluminum and 1 atomic % to 11 atomic % of a secondary metal selected from the group consisting of magnesium, lithium, silicon, titanium, zirconium, and combinations thereof. The exemplary alloy material may further comprise up to about 10 atomic % of a tertiary metal selected from the group consisting of Be, Ca, Sr, Ba, Ra, Sc, V, Cr, Mn, Fe, Co, Ni, Cu, Zn, Y, Nb, Mo, Tc, Ru, Rh, Pd, Ag, Cd, W, and combinations thereof.

The cryogenic milling process, including temperature and the introduction of liquid nitrogen, is controlled. The liquid nitrogen contributes to the formation of nitrides of aluminum and may also contribute to the formation of titanium nitrides. In one example, the mill is maintained at about −320° F.

In step 14, the initial aluminum-alloy raw material powder is introduced into the mill. It is preferred to handle the starting metallic raw material powders in a substantially oxygen free atmosphere. For instance, the aluminum or aluminum alloy powder material is preferably supplied by atomizing the aluminum or aluminum alloy material from an aluminum or aluminum alloy material source and collecting and storing the atomized aluminum or aluminum alloy powders in a container under an argon or other inert atmosphere. The aluminum or aluminum alloy powder is generally held in the argon atmosphere, or in a dry nitrogen atmosphere, throughout all handling, including the operation of mixing the aluminum or aluminum alloy powder with any additional metals prior to milling. Holding the raw aluminum or aluminum alloy powder material within an argon or nitrogen atmosphere prevents the surface of the aluminum or aluminum alloy particles from excessive oxidation. The dry nitrogen or argon atmosphere also prevents contaminants such as moisture from reacting with the raw metal powder. Since magnesium and other metals readily oxidize, they are treated in the same manner as aluminum or aluminum alloy prior materials to milling. Thus, the aluminum or aluminum alloys and other metal powders are preferably supplied uncoated, meaning without a coating of metal oxides.

The metal is processed by stirring, preferably using a medium such as hardened stainless steel, tungsten carbide, or ceramic balls, within the high-energy cryogenic, attritor-type ball milling device to fully homogenize the raw feed stock material and to impart severe mechanical deformation to produce an ultra-fine, submicron grain microstructure.

Referring now to FIG. 2, a sectioned view of a high-energy attritor-type, cryogenic ball-milling device is shown generally as 50. A quantity of aluminum or aluminum-alloy powder material 52 is introduced to a stirring chamber 54 through an input 56. The aluminum or aluminum-alloy material 52, is preferably introduced into the cryogenic milling device in conjunction with liquid nitrogen at about a temperature of −320° F. (−196° C.) to form a slurry mixture. The temperature of the slurry mixture and the milling device is maintained by using liquid nitrogen as a cooling source 58. Thus, the milling device and its contents are supercooled to about the temperature of the liquid nitrogen temperature and held during the milling process. Of course, other gases such as liquid helium or argon may be used in the slurry mixture inside the milling device and for cooling the device itself. Liquid nitrogen is preferred because it may provide additional strength and high temperature stabilization through the formation of intrinsic aluminum nitride particles. Using a different liquid gas may result in an aluminum alloy material that does not have the benefits associated with the nitrides in the resulting microstructure. Further, stearic acid (about 0.20% by weight) may be introduced into the device to provide lubricity for the milling process. It promotes the fracturing and re-welding of metal particles during milling, leading to more rapid milling, and leading to a larger fraction of milled powder produced during a given process cycle.

The stirring chamber 54 has a stirring rod 60 coupled to a motor 62 or similar rotational device that controls the rotational rate. The aluminum or aluminum-alloy powders 52 contact the milling medium such as stainless steel balls 64 disposed within the chamber 54. The stirring rod or rotating impeller 60 moves the balls 64 to achieve the severe mechanical deformation needed to reduce the grain size of the aluminum or aluminum-alloy powder material 52 by stirring, grinding, or milling action. For typical aluminum powder material, the rotational rate is approximately 100-300 revolutions per minute (RPM).

By the constant mixing and severe mechanical deformation that is achieved by the moving balls 64, the aluminum or aluminum-alloy powder material 52 is moved through the stirring chamber 54 to produce ultra-fine, submicron grain size. Once complete, the powder material exits through an outlet 66 or is otherwise removed having a grain size that has been reduced to preferably between approximately 100 and 500 nanometers as a result of the mixing process. More preferably, the range of resulting grain size may be approximately 100-300 nanometers. These grain sizes correspond to grain sizes of less than 6 as defined by ASTM E 112.

The method does not rely on the supplemental addition of oxides, nitrides, or similar refractory substances. According to one embodiment, refractory materials are advantageously present within the invented alloy material in amounts less than about 0.5 volume %. More advantageously, refractory materials are present in amounts of less than about 0.2 volume %.

The aluminum or aluminum-alloy powder material is removed from the stirring chamber. The aluminum powder is agglomerated into rounded agglomerates typically having a high-level of nitrogen in addition to carbon and hydrogen obtained from the presence of the stearic acid. Also, there may be a relatively high iron content as a result of the contamination generated through contact with the steel ball medium during the cryomilling process.

The stirring rate and length of time within the cryogenic milling device is dependent upon the type and amount of material introduced to the device, the aluminum or aluminum-alloy material within the device, and the size of the chamber used for mixing the aluminum or aluminum-alloy material. In one embodiment the speed of the attritor was approximately 100-300 RPM for roughly eight hours.

Referring again to FIG. 1, in step 16, the homogenized, agglomerated raw material powder is degassed. This may be performed in a separate device after removal from the cryogenic, attritor-type ball milling device. The degassing is an important step for eliminating gas contaminates that jeopardize the outcome of subsequent processing steps on the resulting material quality and may take place in a high vacuum, turbomolecular pumping station. By way of example, a degassing process may occur in a nitrogen atmosphere, typically between 600° F. and 850° F. in a vacuum of approximately $10^{-5}$ Torr for about 72 hours. The fine grain size of the metal has the unique and useful property of being stable on annealing to temperatures of about 850° F. This enables the powder to endure the relatively high temperatures experienced during degassing and consolidation while maintaining the fine grain size that contributes to strength.

In step 18, after degassing and removal from the cryogenic milling device, the powder material is consolidated to form an aluminum-alloy material having an ultra-fine, submicron grain particle size, i.e. average grain size less than about 500 nm, preferably between about 100 and about 500 nm, and more preferably less than about 300 nm, such as from 100 nm to 250 nm. The consolidation may take the form of hot isostatic pressing (HIP). By controlling the temperature and pressure the HIP processing densifies the material. An exemplary HIP process would be approximately +850° F. under a pressure of about 15 ksi for approximately four hours. The densification process may take place in a controlled, inert atmosphere such as in an argon gas atmosphere. Other processing such as a Ceracon-type, non-isostatic forging process may be used. This allows an alternative, quasi-isostatic consolidation process to the HIP process step. Alternatively, the consolidation may take place via hot-rolling of the degassed cryomilled powder.

In step 20, the resulting aluminum or aluminum-alloy ultra-fine, submicron grain material is subjected to manufacturing steps associated with formation of a sheet from the consolidated material. As used herein, the term "sheet" generally refers to a metal article having substantially uniform thickness under 6.5 mm (¼ in.) thick and considerable length and width. "Substantially uniform thickness" is understood to mean a uniform thickness within those tolerances allowed in traditional aluminum sheet processing methods. "Considerable length and width" are generally understood in the art as defining a planar sheet, and typically refer to an article having a length and width that are each at least 2.5 times the thickness of the article. Forming the initially flat sheet to final shapes may include process steps such as mechanical cold- or hot-working and cold- or hot-forming, but not requiring the associated thermal or heat-treatment steps, including water quenching, typically applied to conventional high strength aluminum alloy materials.

One benefit of the material produced in accordance with this invention is that subsequent thermal treatments including quench steps are not necessary. A simple recovery thermal treatment may be performed, however, to remove excessive cold work hardening and to recover ductility. This typically involves heating to a temperature above 600° F. but generally below 700° F., followed by a natural air cool.

According to one advantageous embodiment, the densified cryomilled aluminum alloy material is subject to a sequence of hot and cold-rolling to form a metallic sheet. Because of the unique ultra-fine grain structure of the consolidated alloy material, the cryomilled metal may not require hot rolling prior to any cold working. The consolidated workpiece is advantageously rolled in a conventional manner to effect an initial substantial reduction of at least about 30% in its thickness and may result in reductions of thickness up to about 90%.

Referring to FIGS. 3a and 3b, exemplary methods of fabricating the nanophase aluminum or aluminum-alloy material sheets is by use of a traditional rolling mill. FIG. 3a illustrates the use of a two-high rolling mill in which a metal billet, plate, or sheet of a first thickness 100 is compressed between two rotating rolls 120 and 122 to a plate or sheet of a second thickness 140. FIG. 3b illustrates the use of a four-high rolling mill in which a metal billet, plate, or sheet of a first thickness 100' is compressed between two rotating rolls 120' and 122' to a plate or sheet of a second thickness 140'. The compression rolls 120' and 122' are reinforced by rolls 130 and 132.

Intermediate recovery processes may be utilized to lower the sheet hardness and facilitate continued roll-reduction of sheet thickness. During cold-rolling, the workpiece is optionally subject to an intermediate heating stage at a temperature, in a range between about 600° F. and about 700° F., under conditions of time and temperature suitable for reducing the amount of constituents in solid solution in the aluminum matrix while maintaining the workpiece substantially free of recrystallization or grain growth. The intermediate heating step may be performed in any convenient way, for example as a fast, continuous anneal, or as a batch anneal. The intermediate heating step, if any, is followed by a further cold-rolling stage, to reduce the workpiece by at least about 30% to the desired final sheet gauge. Typical total cold reductions are 60% to 95% of the sheet thickness during the cold-rolling operations.

The resultant sheet, at the final gauge, is then optionally subjected to a final partial or full anneal, typically at a temperature between about 600° F. and about 700° F. for a period of about one hour.

The resultant aluminum-alloy material sheet may be formed into useful shapes using prior art techniques used to form objects from aluminum sheets. Forming techniques may include, for example, die forming, shearing, bending, stretch forming, hydroforming and deep drawing.

The resultant formed sheet component may be utilized individually or may be fastened to other mechanical components for use in structures such as aerospace vehicles. The formed sheet component may be joined to other components by conventional welding techniques, friction stir welding, or by fasteners such as those known in the art, e.g. rivets, bolts, locknuts, etc. The term "friction stir welding" refers generally to the technique of engaging two adjoining workpieces on either side of the linear joint by a rotating stir pin or spindle and urging the spindle and the workpieces together, thereby causing frictional heating by the interaction between the spindle and the workpieces which results in plasticization and welding of the material on either side of the joint. An exemplary method of friction stir welding is provided in U.S. Pat. No. 6,367,681, incorporated herein by reference to the extent it is not inconsistent with the instant disclosure. Friction stir welding is especially compatible with the cryomilled, submicron grained aluminum-alloy material sheet since the heat generated by the friction welding does not over-age and soften the cryomilled aluminum-alloy material, as is the case with conventional age-hardened aluminum-alloy materials.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing an aluminum or aluminum-alloy material sheet comprising
   providing an aluminum or aluminum-alloy metal powder having ultra-fine, submicron grain size by cryomilling an aluminum or aluminum-alloy raw material, agglomerating the aluminum or aluminum-alloy metal powder following the cryomilling and degassing the aluminum or aluminum-alloy metal powder following the agglomerating;
   consolidating the metal powder following the degassing; and
   cold-forming the consolidated metal into a sheet comprising:
      initially cold-forming the consolidated metal into an intermediate form;
      heating the intermediate form to a temperature between 600° F. and 700° F. following initial cold-forming of the consolidated metal to reduce cold work hardening and to improve ductility, wherein heating the intermediate form to reduce cold work hardening and to improve ductility comprises maintaining the workpiece substantially free of recrystallization or grain growth; and
      further cold-forming the consolidated metal after heating the intermediate form.

2. The method of claim 1, wherein the step of further cold-forming is performed without subsequent thermal processing.

3. The method of claim 1, further comprising the step of thermal processing after further cold-forming the consolidated metal.

4. The method of claim 1, further comprising the step of extruding the consolidated metal powder prior to cold-forming the sheet.

5. The method of claim 1, wherein the step of providing metal powder comprises
   providing an aluminum or aluminum-alloy metal powder; and wherein cryomilling an aluminum or aluminum-alloy raw material comprises cryomilling the metal powder such that the resultant metal powder has an average grain size of less than 500 nanometers.

6. The method of claim 5, wherein the grain size of the material is sized to between about 100 and about 500 nanometers.

7. The method of claim 5, wherein the step of cryomilling comprises:
   supplying the metal powder to a ball mill attritor;
   maintaining the supply of metal powder in a liquid nitrogen medium;
   activating the attritor, whereby the metal powder is repeatedly impinged between metal balls within the attritor;
   deactivating the attritor; and,
   removing the cryomilled metal powder from the attritor.

8. The method of claim 7, wherein the step of cryomilling is continued until the equilibrium grain size of the metal is reached.

9. The method of claim 1, wherein the metal powder is commercially pure aluminum or an aluminum-alloy material composed of at least 50% aluminum by weight in combination with alloying elements selected from the group consisting of magnesium, titanium, molybdenum, vanadium, tungsten, iron, nickel, cobalt, manganese, copper, niobium, zinc, lithium, silicon, titanium, chromium, and combinations thereof.

10. The method of claim 7, wherein the step of providing a metallic powder comprises providing a metallic powder substantially free of oxides.

11. The method of claim 1, wherein the step of consolidating the ultra-fine, submicron grain material to form a densified ultra-fine, submicron grain material comprises hot isostatic pressing the ultra-fine, submicron grain material to form a densified ultra-fine, submicron grain material.

12. The method of claim 1, wherein the step of consolidating the ultra-fine, submicron grain material to form a densified ultra-fine, submicron grain material comprises Ceracon-type forge consolidating the ultra-fine, submicron grain material to form a densified ultra-fine, submicron grain material.

13. The method of claim 1 wherein initially cold-forming comprises initially cold rolling the consolidated metal into the intermediate form, and wherein further cold-forming comprises further cold rolling the consolidated metal after heating the intermediate form.

14. The method of claim 1 wherein heating the intermediate form comprises heating the intermediate form to a temperature between 600° F. and 700° F. and thereafter permitting the intermediate form to air cool.

15. The method of claim 1, wherein the step of forming is performed without water quenching.

* * * * *